US012524726B2

(12) United States Patent
Dey et al.

(10) Patent No.: US 12,524,726 B2
(45) Date of Patent: Jan. 13, 2026

(54) KNOWLEDGE MODELLING AND NATURAL TEXT-BASED QUERYING FRAMEWORK

(71) Applicant: Accenture Global Solutions Limited, Dublin (IE)

(72) Inventors: Kuntal Dey, Birbhum (IN); Kapil Singi, Bangalore (IN); Kanchanjot Kaur Phokela, New Delhi (IN); Swapnajeet Choudhury, Bangalore (IN); Ritu Pramod Dalmia, Mumbai (IN); Vibhu Saujanya Sharma, Bangalore (IN); Vikrant Kaulgud, Pune (IN); Teresa Sheausan Tung, Los Angeles, CA (US); Alok Tyagi, Sammamish, WA (US); Lan Guan, New York, NY (US); Sundharraman Karthik Narain, Los Gatos, CA (US); Gopali Raval Contractor, Mumbai (IN); Jagan Mohan Kaliamurthy, Bangalore (IN); Margaret Cooney Ding, Hallettesville, TX (US); Srinivasan Saravanamuthu, Issaquah, WA (US); Rajendra Prasad Tanniru, Basking Ridge, NJ (US); Niel Eyde, St. Petersburg, FL (US); Pragya Sharma, Mumbai (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 255 days.

(21) Appl. No.: 18/463,002

(22) Filed: Sep. 7, 2023

(65) Prior Publication Data
US 2025/0086563 A1 Mar. 13, 2025

(51) Int. Cl.
*G06Q 10/067* (2023.01)
*G06F 16/334* (2025.01)

(52) U.S. Cl.
CPC ....... *G06Q 10/067* (2013.01); *G06F 16/3344* (2019.01)

(58) Field of Classification Search
CPC .................. G06Q 10/067; G06F 16/3344
See application file for complete search history.

(56) References Cited

U.S. PATENT DOCUMENTS 10,915,577 B2 * 2/2021 Srinivasan .............. G06F 16/36
2019/0155924 A1 * 5/2019 Guggilla .............. G06F 16/335
(Continued)

*Primary Examiner* — Van H Oberly
*Assistant Examiner* — Ranjit P Doraiswamy
(74) *Attorney, Agent, or Firm* — Mannava & Kang, P.C.

(57) ABSTRACT

Aspects of the present disclosure provide systems, methods, and computer-readable storage media that support intelligent re-use of knowledge (e.g., across an organization) using a natural text-based querying framework. A knowledge representation of prior work performed for the organization may be generated based on organizational knowledge (e.g., historical work record data that identifies a plurality of work items across an organization). The knowledge representation may include individual work-record entities for each respective work item and individual knowledge graphs corresponding to the individual work-record entities. For each individual knowledge graph, operations may be performed to identity and store project name, subgraph, sentence embedding, and word embedding information. Responsive to receiving an augmented user query, query-record mapping operations may be performed based at least in part on a comparison of information associated with the augmented user query to the project name, sentence embedding, word embedding, subgraph information, or a combination thereof.

18 Claims, 5 Drawing Sheets

(56) References Cited

U.S. PATENT DOCUMENTS

2024/0289407 A1\* 8/2024 Rofouei .............. G06F 16/9577
2025/0063083 A1\* 2/2025 Grinberg .......... G06Q 10/06393

\* cited by examiner

KNOWLEDGE MODELLING AND NATURAL
TEXT-BASED QUERYING FRAMEWORK

TECHNICAL FIELD

The present disclosure relates generally to knowledge modelling and more specifically to knowledge modelling to support intelligent re-use of knowledge according to a natural text-based querying framework.

BACKGROUND

In corporate settings (particularly in large corporate settings), there may be a wealth of knowledge that builds up across multiple projects. However, there may be significant challenges associated with connecting different grains of knowledge from each of the individual projects in an abstract manner. As such, it may be difficult to utilize insights arising from such projects at an organizational scale. That is, in some cases, insights gleaned from a particular individual project may be available for utilization only for that particular individual project, but not at the organizational scale. As an illustrative example, in some cases, such insights may include knowledge associated with the use of one or more generative artificial intelligence (AI) tools as part of a particular individual project (e.g., a software development project). Several generative AI tools exist that, when given an objective by a user, are capable of identifying underlying steps and actions that the user needs to take in order to attain the objective. Many existing generative AI tools are capable of focusing on a limited set of tasks and may be particularly well-suited to those specific tasks but may not be well-suited to other tasks. Further, many existing generative AI tools have evolved such that they are significantly more capable of understanding human instructions and converting those instructions into actions that can be taken by underlying computer systems. However, there may be significant challenges associated with utilizing any insights associated with the use of such generative AI tool(s) as part of that particular individual project at the organizational scale.

SUMMARY

Aspects of the present disclosure provide systems, methods, and computer-readable storage media that support intelligent re-use of knowledge (e.g., for multiple distinct projects spread across an organization) using a natural text-based querying framework.

According to some embodiments, a method for intelligent re-use of knowledge across an organization using a natural text-based querying framework is disclosed. The method may include obtaining, by one or more processors, organizational knowledge from one or more data sources. The organizational knowledge may include at least historical work record data that identifies a plurality of work items across an organization. The method may include generating, by the processor(s), a knowledge representation of prior work performed for the organization based at least in part on the organizational knowledge. Generating the knowledge representation may include performing one or more extraction operations to create individual work-record entities for each respective work item of the identified work items and may also include performing one or more knowledge graph creation operations to create individual knowledge graphs corresponding to the individual work-record entities. The method may include storing, by the processor(s), the knowledge representation at a graph database. The method may include performing, by the processor(s), for each individual knowledge graph, a plurality of operations. The plurality of operations may include: name operations to identity and store project name information (e.g., at a project name information database); subgraph operations to identify and store subgraph information (e.g., at a subgraph database); sentence embedding operations to identify and store sentence embedding information (e.g., at a sentence embedding information database); and word embedding operations to identify and store word embedding information (e.g., at a word embedding information database). The method may also include performing, by the processor(s), one or more query-record mapping operations responsive to receiving an augmented user query. The augmented user query may be generated based at least in part on query data associated with a user query, and the query-record mapping operations may be performed based at least in part on a comparison of information associated with the augmented user query to the project name information, the sentence embedding information, the word embedding information, the subgraph information, or a combination thereof.

According to some embodiments, a system for intelligent re-use of knowledge across an organization using a natural text-based querying framework is disclosed. The system may include a memory and one or more processors communicatively coupled to the memory. The processor(s) may be configured to obtain organizational knowledge from one or more data sources. The organizational knowledge may include at least historical work record data that identifies a plurality of work items across an organization. The processor(s) may be configured to generate a knowledge representation of prior work performed for the organization based at least in part on the organizational knowledge. Generating the knowledge representation may include performing one or more extraction operations to create individual work-record entities for each respective work item of the identified work items and may also include performing one or more knowledge graph creation operations to create individual knowledge graphs corresponding to the individual work-record entities. The processor(s) may be configured to store the knowledge representation at a graph database. The processor(s) may be configured to perform, for each individual knowledge graph, a plurality of operations that may include: name operations to identity and store project name information (e.g., at a project name information database); subgraph operations to identify and store subgraph information (e.g., at a subgraph database); sentence embedding operations to identify and store sentence embedding information (e.g., at a sentence embedding information database); and word embedding operations to identify and store word embedding information (e.g., at a word embedding information database). The processor(s) may be configured to perform one or more query-record mapping operations responsive to receiving an augmented user query. The augmented user query may be generated based at least in part on query data associated with a user query, and the query-record mapping operations may be performed based at least in part on a comparison of information associated with the augmented user query to the project name information, the sentence embedding information, the word embedding information, the subgraph information, or a combination thereof.

According to some embodiments, a non-transitory computer-readable storage medium storing instructions that, when executed by one or more processors, cause the one or more processors to perform operations for intelligent re-use of knowledge across an organization using a natural text-based querying framework is disclosed. The operations may include obtaining organizational knowledge from one or more data sources. The organizational knowledge may include at least historical work record data that identifies a plurality of work items across an organization. The operations may include generating a knowledge representation of prior work performed for the organization based at least in part on the organizational knowledge. Generating the knowledge representation may include performing one or more extraction operations to create individual work-record entities for each respective work item of the identified work items and may also include performing one or more knowledge graph creation operations to create individual knowledge graphs corresponding to the individual work-record entities. The operations may include storing the knowledge representation at a graph database. The operations may include performing, for each individual knowledge graph, a plurality of operations that may include: name operations to identity and store project name information (e.g., at a project name information database); subgraph operations to identify and store subgraph information (e.g., at a subgraph database); sentence embedding operations to identify and store sentence embedding information (e.g., at a sentence embedding information database); and word embedding operations to identify and store word embedding information (e.g., at a word embedding information database). The operations may also include performing one or more query-record mapping operations responsive to receiving an augmented user query. The augmented user query may be generated based at least in part on query data associated with a user query, and the query-record mapping operations may be performed based at least in part on a comparison of information associated with the augmented user query to the project name information, the sentence embedding information, the word embedding information, the subgraph information, or a combination thereof.

The foregoing has outlined rather broadly the features and technical advantages of the present disclosure in order that the detailed description that follows may be better understood. Additional features and advantages will be described hereinafter which form the subject of the claims of the disclosure. It should be appreciated by those skilled in the art that the conception and specific aspects disclosed may be readily utilized as a basis for modifying or designing other structures for carrying out the same purposes of the present disclosure. It should also be realized by those skilled in the art that such equivalent constructions do not depart from the scope of the disclosure as set forth in the appended claims. The novel features which are disclosed herein, both as to organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following descriptions taken in conjunction with the accompanying drawings, in which.

It should be understood that the drawings are not necessarily to scale and that the disclosed aspects are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular aspects illustrated herein.

DETAILED DESCRIPTION

Aspects of the present disclosure provide systems, methods, apparatus, and computer-readable storage media that support intelligent re-use of knowledge (e.g., for multiple distinct projects spread across an organization) using a natural text-based querying framework. The present disclosure describes various processes to bridge the organizational gap by intelligently composing a high-quality chain of AI tools. The system and associated methods for intelligent re-use of knowledge of the present disclosure may perform exemplary operations such as composing a chain of tools, driven by mapping of user queries into one or more tool sets and then chaining those tools in each mapped set, with prior organizational knowledge about the tool performance in prior problems, and proximity of the problem-at-hand with the prior problems, jointly being used to create a potential quality score of each tools chain, thereby leading to validation of the choice of the chain of tools.

The present disclosure includes two phases, also referred to herein as "Phase 1" which corresponds to a tool short-listing phase and "Phase 2" which corresponds to task-specific qualification of the shortlisted tools. With respect to Phase 1 ("tool shortlisting"), the present disclosure describes identifying a set of tool chain sets (to complete the whole or parts of the work-at-hand) from a multitude of tools (AI tools and otherwise), and in some cases identifying a set of tool chain sets are identified to complete the whole or parts of the work-at-hand. With respect to Phase 2 ("task-specific qualification of shortlisted tools"), the present disclosure describes processes that include, for each task (pattern such as a generative AI pattern), within the work-at-hand, or for the work-at-hand overall, an assessment is made as to how well the tool has performed to finalize the tools. Post-work, the performances of the tools used for the current work along with the work type (task and pattern) may be recorded for future reference.

Figure 1:
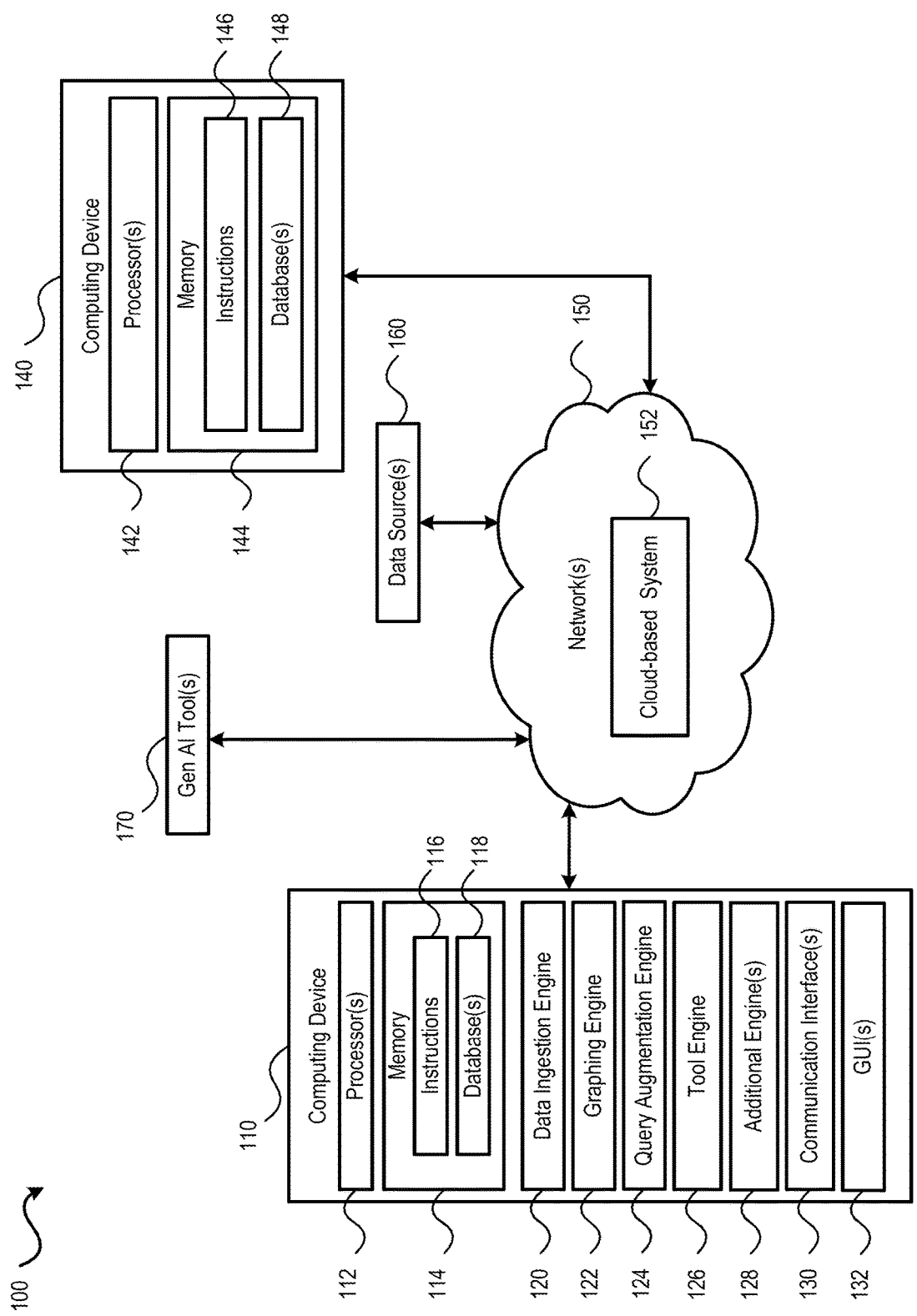
FIG. 1 is a block diagram illustrating an exemplary system that supports intelligent re-use of knowledge across an organization using a natural text-based querying framework, according to one or more aspects of the present disclosure.

Referring to FIG. 1, a block diagram illustrating an exemplary system that supports intelligent re-use of knowledge using a natural text-based querying framework according to one or more aspects of the present disclosure is shown as a system 100. As shown in FIG. 1, the system 100 includes a computing device 110, a computing device 140, one or more networks 150, a cloud-based system 152, and one or more data sources 160. The computing device 110 and/or the computing device 140 may include or correspond to a desktop computing device, a laptop computing device, a personal computing device, a tablet computing device, a mobile device (e.g., a smart phone, a tablet, a personal digital assistant (PDA), a wearable device, and the like), a server, a virtual reality (VR) device, an augmented reality (AR) device, an extended reality (XR) device, a vehicle (or a component thereof), an entertainment system, other computing devices, or a combination thereof, as non-limiting examples. The computing device 110 includes one or more processors 112, a memory 114, a data ingestion engine 120, a graphing engine 122, a query augmentation engine 124, a tool engine 126, one or more additional engines 128, and one or more communication interfaces 130. In some implementations the computing device 110 may also provide one or more graphical user interfaces (GUIs) 132 that enable a user to interact with the functionality described in connection with the computing device 110. In additional or alternative implementations, the GUI(s) 132 may be provided by another device of the system 100, such as computing device 140, as described in more detail below and illustrated with reference to FIG. 2. In some other implementations, one or more of the components 120-132 may be optional, one or more of the components 120-132 may be integrated into a single component (e.g., the data ingestion engine 120 and the graphing engine 122 may be combined, etc.), one or more additional components may be included in the computing device 110, or combinations thereof (e.g., some components may be combined into a single component, some components may be omitted, while other components may be added).

It is noted that functionalities described with reference to the computing device 110 are provided for purposes of illustration, rather than by way of limitation and that the exemplary functionalities described herein may be provided via other types of computing resource deployments. For example, in some implementations, computing resources and functionality described in connection with the computing device 110 may be provided in a distributed system using multiple servers or other computing devices, or in a cloud-based system using computing resources and functionality provided by a cloud-based environment that is accessible over a network, such as the one of the one or more networks 150. To illustrate, one or more operations described herein with reference to the computing device 110 may be performed by one or more servers or a cloud-based system 152 that communicates with one or more client or user devices.

The one or more processors 112 may include one or more microcontrollers, application specific integrated circuits (ASICs), field programmable gate arrays (FPGAs), central processing units (CPUs) and/or graphics processing units (GPUs) having one or more processing cores, or other circuitry and logic configured to facilitate the operations of the computing device 110 in accordance with aspects of the present disclosure. The memory 114 may include random access memory (RAM) devices, read only memory (ROM) devices, erasable programmable ROM (EPROM), electrically erasable programmable ROM (EEPROM), one or more hard disk drives (HDDs), one or more solid state drives (SSDs), flash memory devices, network accessible storage (NAS) devices, or other memory devices configured to store data in a persistent or non-persistent state. Software configured to facilitate operations and functionality of the computing device 110 may be stored in the memory 114 as instructions 116 that, when executed by the one or more processors 112, cause the one or more processors 112 to perform the operations described herein with respect to the computing device 110. Additionally, the memory 114 may be configured to store data and information in one or more databases 118. Illustrative aspects of the types of information that may be stored in the one or more databases 118 are described in more detail below.

In the example system 100 depicted in FIG. 1, the computing device 140 may also include one or more processors 142 and a memory 144. According to some embodiments, the computing device 140 may correspond to a user device, such as the user device 222 illustrated and described further herein with respect to FIG. 2. The processor(s) 142 of the computing device 140 depicted in FIG. 1 may include one or more microcontrollers, ASICs, FPGAs, CPUs and/or GPUs having one or more processing cores, or other circuitry and logic configured to facilitate various operations of the computing device 140. The memory 144 of the computing device 140 depicted in FIG. 1 may include RAM devices, ROM devices, EPROM, EEPROM, HDDs, SSDs, flash memory devices, NAS devices, or other memory devices configured to store data in a persistent or non-persistent state. As with the computing device 110 of FIG. 1, software configured to facilitate operations and functionality of the computing device 140 depicted in FIG. 1 may be stored in the memory 144 as instructions 146 that, when executed by the processor(s) 142, cause the processor(s) 142 to perform various operations (such as operations described further herein with respect to the user device 222 of FIG. 2). Additionally, the memory 144 may be configured to store data and information in one or more databases 148. Illustrative aspects of the types of information that may be stored in the one or more databases 148 are described in more detail below with respect to the user device 222 of FIG. 2.

The one or more communication interfaces 130 of the computing device 110 of FIG. 1 may be configured to communicatively couple the computing device 110 to the one or more networks 150 via wired or wireless communication links established according to one or more communication protocols or standards (e.g., an Ethernet protocol, a transmission control protocol/internet protocol (TCP/IP), an Institute of Electrical and Electronics Engineers (IEEE) 802.11 protocol, an IEEE 802.16 protocol, a 3rd Generation (3G) communication standard, a 4th Generation (4G)/long term evolution (LTE) communication standard, a 5th Generation (5G) communication standard, and the like). In some implementations, the computing device 110 includes one or more input/output (I/O) devices (not shown in FIG. 1) that include one or more display devices, a keyboard, a stylus, one or more touchscreens, a mouse, a trackpad, a microphone, a camera, one or more speakers, haptic feedback devices, or other types of devices that enable a user to receive information from or provide information to the computing device 110. In some implementations, the computing device 110 is coupled to the display device, such as a monitor, a display (e.g., a liquid crystal display (LCD) or the like), a touch screen, a projector, a virtual reality (VR) display, an augmented reality (AR) display, an extended reality (XR) display, or the like. In some other implementations, the display device is included in or integrated in the computing device 110.

The data ingestion engine 120 may be configured to provide functionality for collecting data to support the functionality provided by the computing device 110. For example, the data ingestion engine 120 may provide functionality for obtaining data to support the operations of the computing device 110 from one or more data sources. Exemplary types of data that may be obtained using the data ingestion engine 120 include historical work record data, data from other global knowledge sources (such as from one or more data sources 160 accessible via the network(s) 150, as depicted in the example of FIG. 1), or other types of data. The data obtained by the data ingestion engine 120 may be stored in the one or more databases 118 and used by the graphing engine 122, the tool engine 124, the query augmentation engine 126, the additional engine(s) 128, or a combination thereof, to perform operations associated with various aspects of the present disclosure, as described in more detail below.

Figure 2:
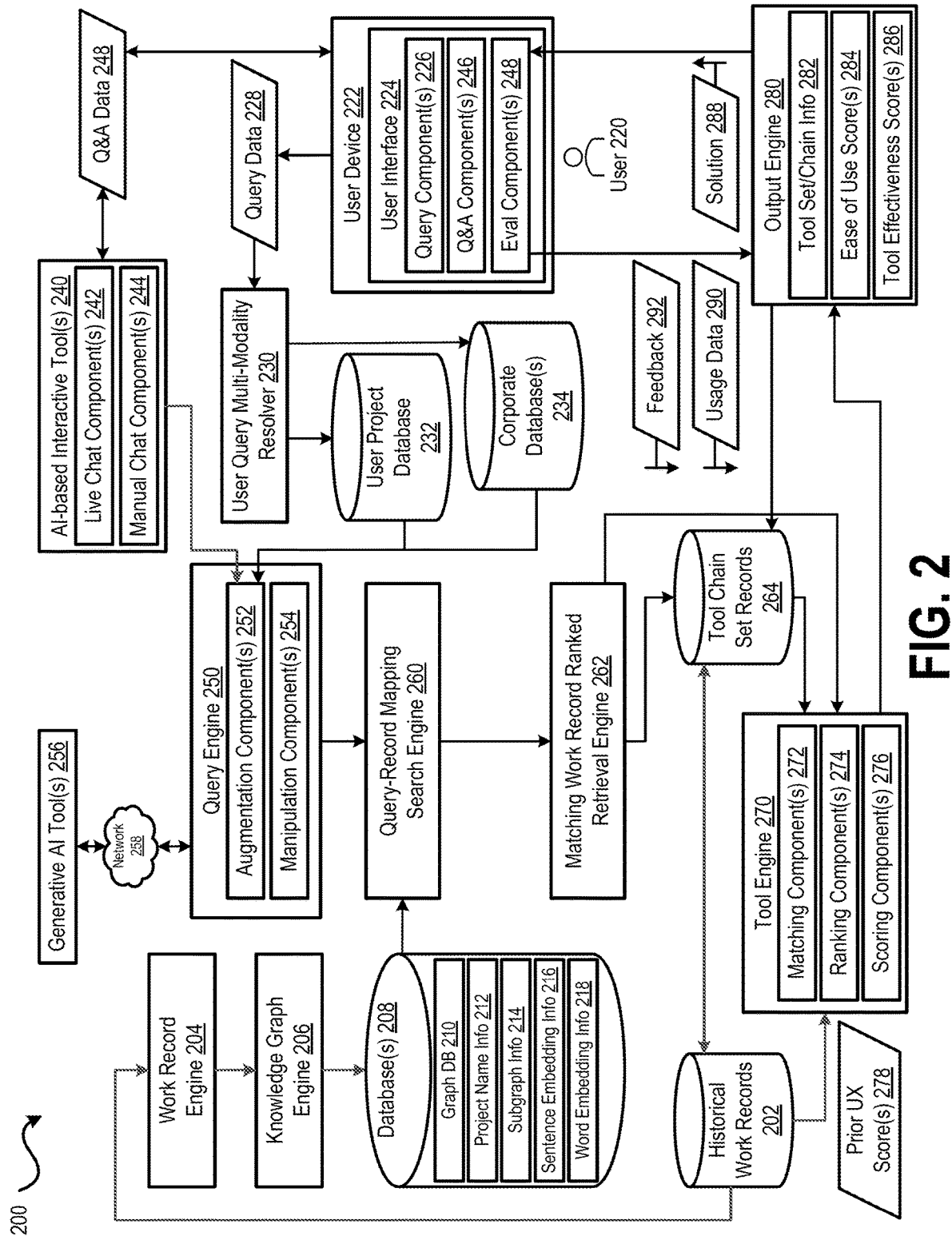
FIG. 2 is a block diagram illustrating exemplary aspects of an example system that supports intelligent re-use of knowledge across an organization using a natural text-based querying framework, according to one or more aspects of the present disclosure.

According to some embodiments, the data ingestion engine 120 may be configured to obtain historical work record data for an organization and/or other knowledge (e.g., for the entire organization) from one or more data sources. For example, in some cases, the historical work records may be stored at the data source(s) 160 accessible via the network(s) 150, and the data ingestion engine 120 may be configured to access the data source(s) 160 to obtain historically available work records and/or other externally available organizational knowledge. According to some aspects of the present disclosure, the data ingestion engine 120 may be configured to utilize such information as part of a "bootstrapping" phase, as further described herein with respect to operations performed in accordance with one or more aspects of the present disclosure for an exemplary system 200 as depicted in FIG. 2. For example, with respect to the "bootstrapping" phase, the data ingestion engine 120 may be configured to assemble knowledge across the entire organization for intelligent re-use of such knowledge, according to one or more aspects of the present disclosure.

According to some embodiments, the graphing engine 122 may include multiple components (not shown in the simplified example depicted in FIG. 1), where each individual component may be configured to perform particular operations associated with one or more aspects of the present disclosure. To illustrate, in some embodiments, the graphing engine 122 may include a "work record extractor" component, a "knowledge graph creator" component, and a "knowledge graph indexer" component. As further described herein with respect to the system 200 depicted in FIG. 2, in some embodiments, the "work record extractor" component of the graphing engine 122 may be configured to create individual work-record entities for each of the work items identified by the data ingestion engine 120 using one or more custom input adapters/agents (adapted to create a work-record entity using various data engineering/ingestion techniques) as part of the "bootstrapping" phase. According to some embodiments, the "knowledge graph creator" component of the graphing engine 122 may be configured to create a graph database that includes each of the work-record entities (as part of the "bootstrapping" phase), as further described herein with respect to the system 200 depicted in FIG. 2. According to some embodiments, the "knowledge graph creator" component of the graphing engine 122 may be configured to perform various operations to create individual knowledge graphs corresponding to the individual work-record entities in the graph database and to store these knowledge graphs at the graph database (as part of the "bootstrapping" phase), as further described herein with respect to the system 200 depicted in FIG. 2. According to some embodiments, once the graph database is created, the "knowledge graph indexer" component of the graphing engine 122 may be configured to perform a multi-level indexing process (as part of the "bootstrapping" phase) according to an indexing mechanism for multi-dimensional indexing of the individual knowledge graphs, as further described herein with respect to the system 200 depicted in FIG. 2. According to some aspects of the present disclosure, as part of the indexing mechanism, the "knowledge graph indexer" component of the graphing engine 122 may be configured to obtain word embeddings generated by one or more global embedding models (as further described herein with respect to the system 200 depicted in FIG. 2) which may correspond to one or more of the data source(s) 160 accessible via the network(s) 150, in some cases.

According to some aspects of the present disclosure, a knowledge graph constructed by the graphing engine 122 may be representative of information contained within an ontology. Stated another way, the ontology represents the graph structure itself and the knowledge graph represents a realization of the ontology with data. As an illustrative example and referring to FIG. 3, a block diagram illustrating various aspects of an exemplary knowledge graph in accordance with the present disclosure is shown as a knowledge graph 300. In the example depicted in FIG. 3, the knowledge graph 300 includes multiple nodes connected via corresponding edges. The nodes are digital representations of aspects of a given work-record (e.g., an objective, intermediate steps, attributes/objects/objectives, sub-attributes/sub-objects/sub-objectives, etc.) identified in the ontology, and different nodes may be associated with different node types based on properties derived from the ontology. To illustrate using the example knowledge graph 300 shown in FIG. 3, node 310 represents a first node type—an Application Delivery Management (ADM) task, such as a software delivery task—and node 312 represents a second node type—a Software Delivery Life Cycle (SDLC) phase, such as a delivery phase. The edges of a particular knowledge graph may be determined based on the ontology and may be used to formalize semantic relationships within the particular knowledge graph. For example, in FIG. 3, edge 314 indicates a semantic relationship between the nodes 310, 312, namely, that the particular ADM task (e.g., a software delivery task) represented by the node 310 is performed as part of the particular SDLC phase (e.g., delivery) represented by the node 312, as indicated by the label "hasSDLC-Phase" associated with the edge 314. It is noted that the edges of the knowledge graph 300 may be defined such that they point from one node to another node (e.g., from node 310 to node 312) or from a node to data, and the particular node an edge points to may be determined based on the semantic relationship information included in the ontology.

Referring back to FIG. 1, the query augmentation engine 124 may be configured to receive and augment "multi-modal" user queries, as further described herein with respect to operations performed in accordance with one or more aspects of the present disclosure for the exemplary system 200 depicted in FIG. 2. In some aspects of the present disclosure, such "multi-modal" queries received from a given user may include at least a portion of one or more project details, one or more project features, one or more objectives, one or more constraints, etc. (or combinations thereof), as further described herein with respect to the system 200 depicted in FIG. 2. According to one aspect of a query augmentation process, FIG. 1 illustrates that one or more generative (Gen) AI tools 170 may be accessible to the query augmentation engine 124 via the network(s) 150, and the generative AI tool(s) 170 may be utilized to perform various operations as further described herein with respect to the system 200 depicted in FIG. 2 (in some cases).

According to some aspects of the present disclosure, the tool engine 126 may be configured to perform various tool matching/ranking/scoring operations in order to provide one or more tool recommendations to assist a user (e.g., to assist a software developer with generative AI powered software delivery), as further described herein with respect to operations performed in accordance with one or more aspects of the present disclosure for the exemplary system 200 depicted in FIG. 2.

According to some aspects of the present disclosure, the additional engine(s) 128 depicted in FIG. 1 may be configured to perform various operations associated with one or more aspects of the present disclosure, as further described herein with respect to operations performed for the exemplary system 200 depicted in FIG. 2.

Thus, the system 100 depicted in FIG. 1 represents an example of a system that supports intelligent re-use of knowledge across an organization using a natural text-based querying framework, according to one or more aspects of the present disclosure.

Referring to FIG. 2, a block diagram illustrating an exemplary system that supports intelligent re-use of knowledge using a natural text-based querying framework according to one or more aspects of the present disclosure is shown as the system 200.

In FIG. 2, at least historical work records 202 may be used to "bootstrap" the system 200, as described further herein. In some aspects, the historical work records 202 may include information corresponding to each work item recorded to have been done in the organization in the past. In some embodiments, if externally available universal global knowledge is available (not shown in the example depicted in FIG. 2), then such information may be utilized in conjunction with the historical work records 202 for "bootstrapping" purposes. With respect to "bootstrapping" of the system 200, FIG. 2 illustrates that a work record engine 204 may be configured to utilize one or more custom input adapters/agents to create work-record entities using various data engineering/ingestion techniques. To illustrate, for each recorded work item of the historical work records 202, the work record engine 204 may be configured to utilize the one or more input adapters/agents to create a corresponding work-record entity. In cases where externally available universal global knowledge is available (not shown in the example depicted in FIG. 2), then the work record engine 204 may be further configured to utilize such knowledge in order to create work-record entities as part of the "bootstrapping" process for the system 200.

FIG. 2 illustrates a knowledge graph (KG) engine 206 that may be configured to receive information from the work record engine 204 (e.g., the work-record entities created as described above) and to perform various additional operations as part of the "bootstrapping" process for the system 200, as further described herein. FIG. 2 illustrates that the system 200 may include one or more databases 208, which may be utilized to store information output by the KG engine 206 for each of the additional operations performed as part of the "bootstrapping" process. In some embodiments, while not shown in the simplified example depicted in FIG. 2, the KG engine 206 may include multiple components such as a KG creator component and a KG indexer component. To illustrate, the KG creator component of the KG engine 206 may be configured to enter each work-record entity received from the work record engine 204 to create a graph database 210, as described further herein. Once the KG engine 206 creates and stores the graph database 210 at the database(s) 208, the KG indexer component of the KG engine 206 may be configured to perform a multi-level indexing process, as described further herein.

According to some embodiments, the KG creator component of the KG engine 206 may be configured to create the graph database 210 by performing the following exemplary operations as part of the "bootstrapping" process for the system 200. For each work-record entity received from the work record engine 204, the KG creator component of the KG engine 206 may be configured to identify an objective of a given work-record entity and to treat the objective as a topmost parent node of a corresponding knowledge graph for the given work-record entity. The KG creator component of the KG engine 206 may be configured to identify each intermediate step (e.g., logical module) recorded for the given work-record entity, to treat each individual intermediate step as a first-level child in a graph connected to the topmost parent node (corresponding to the objective of the given work-record entity), and to establish an ontological relationship marking the corresponding intermediate step. For each of these intermediate steps (representing first-level children in the graph), the KG creator component of the KG engine 206 may be configured to identify each inner component recorded within a given intermediate step (such as each recorded attribute/object/objective within the given intermediate step) and to treat each individual inner component as a second-level child within the graph, with the action label connecting the parent (owning intermediate step) as the ontologically labelled edge. The KG creator component of the KG engine 206 may be configured to label any further sub-object/sub-objective/sub-attribute as a third-level child, with an ontological relationship capturing this semantic in the edge with its parent, etc.

In some cases, each intermediate step may have multiple parents. As described further herein with respect to index searching operations, if an intermediate step is found exactly as-is to be recorded, then that intermediate step record (sub-tree) may be re-used. Similarly, in some cases, each attribute/object/objective may also have multiple parents (thereby also allowing for re-use, as described further herein. Upon creation of the graph database 210 by the KG creator component of the KG engine 206, the KG engine 206 may store the graph database 210 at the one or more databases 208.

According to some embodiments, after the graph database 210 has been created and stored, the KG indexer component of the KG engine 206 may be configured to perform a multi-level indexing process by performing the following exemplary operations as part of the "bootstrapping" process for the system 200. According to some aspects of the present disclosure, the KG indexer component of the KG engine 206 may be configured to perform multi-dimensional indexing operations, with objectives including: project name-based active retrieval; project intermediate step, action item and attribute-based retrieval; productivity node, pattern and ADM-based retrieval; and free-text user query-based retrieval. In each case, such indexing operations may allow for an end user to retrieve a work-record subgraph of an explicitly requested query or an implicitly relevant query, as described further herein.

As part of the multi-level indexing process, the KG indexer component of the KG engine 206 may be configured to generate a regular primary index for each project name that may point to one work-record. In some cases, such a regular primary index may be similar to a traditional relational database primary index except that the regular primary index may offer no sequential storage guarantee. As part of the multi-level indexing process, the KG indexer component of the KG engine 206 may be configured to generate a regular primary index for each intermediate step. As part of the multi-level indexing process, the KG indexer component of the KG engine 206 may be configured to generate a regular primary index for each action item. As part of the multi-level indexing process, the KG indexer component of the KG engine 206 may be configured to independently generate another regular primary index for each attribute/object/objective. In the simplified example depicted in FIG. 2, each individual regular primary index generated by the KG indexer component of the KG engine 206 may be stored at the one or more databases 208 as part of project name information 212. As part of the multi-level indexing process, the KG indexer component of the KG engine 206 may be configured to generate a subgraph-based text index for each of the entities described above. To illustrate, the KG indexer component of the KG engine 206 may generate a separate subgraph-based text index for each project name, individual step, and attribute/object/objective. In the simplified example depicted in FIG. 2, each individual subgraph-based text index generated by the KG indexer component of the KG engine 206 may be stored at the one or more databases 208 as part of subgraph information 212.

As part of the multi-level indexing process, the KG indexer component of the KG engine 206 may be configured to utilize one or more global embedding models (not shown in the simplified example depicted in FIG. 2) to generate word embeddings, such as GloVe, BERT, etc. (among other possible options). According to some embodiments, the KG indexer component of the KG engine 206 may be configured to extract word embeddings (e.g., using one or more of the example embedding models identified above) for each keyword (word) present in the descriptor of the nodes and edges in the subgraph under the entity directed from itself towards its lower levels (e.g., first level keyword will have itself, edge label of its outgoing edges, labels of all its second-level children, and all the way below it). According to some aspects, the KG indexer component of the KG engine 206 may be configured to utilize one or more of the example embedding models identified above to generate embedding repositories (not shown in the simplified example depicted in FIG. 2) for storage at the database(s) 208 whenever updates are made to a given knowledge graph or alternatively may be configured to run the example embedding model(s) each time in order to extract word embeddings. The KG indexer component of the KG engine 206 may be configured to form a pseudo-sentence by traversing from the entity to the final leaf of the graph database 210 (in which, by construction, each downward path will be an outgoing Directed Acyclic Graph or "DAG") and to perform a sentence embedding using various sentence embedding techniques, where such an embedding is associated with the keyword under concern in order to generate an index (referred to herein as a "pseudo sentence-embedding index"). As part of the multi-level indexing process, the KG indexer component of the KG engine 206 may be configured to generate a pseudo sentence-embedding index for each of the entities described above. To illustrate, the KG indexer component of the KG engine 206 may generate a separate pseudo sentence-embedding index for each project name, individual step, and attribute/object/objective. In the simplified example depicted in FIG. 2, each individual pseudo sentence-embedding index generated by the KG indexer component of the KG engine 206 may be stored at the one or more databases 208 as part of sentence embedding information 216.

According to some embodiments, the KG indexer component of the KG engine 206 may be configured to compute a weighted average in order to have a single embedding (where weights may be higher for the entities closer to the given keyword), where this embedding is associated with the keyword under concern and the weighted average is referred to herein as an "average word embedding index". As part of the multi-level indexing process, the KG indexer component of the KG engine 206 may be configured to generate an average word embedding index for each of the entities described above. To illustrate, the KG indexer component of the KG engine 206 may generate a separate average word embedding index for each project name, individual step, and attribute/object/objective. In the simplified example depicted in FIG. 2, each individual average word embedding index generated by the KG indexer component of the KG engine 206 may be stored at the one or more databases 208 as part of word embedding information 218.

In some embodiments, subgraph indexing operations may also be carried out using one or more subgraph indexing techniques. Thus, at the end of the indexing process, each entity may have four indices associated with itself: a primary index; a pseudo-sentence embedding index; an average word embedding index; and a subgraph index. In some embodiments, each entity may have one, two, or three out of the four indices. In case a recursion is used to expand steps (as described further herein), then the input pseudo-sentence may be formed by breadth-first expansion of the attributes fetched by the recursion. Each of the indices stored at the database(s) 208 may be utilized according to various aspects of the present disclosure, as further described herein.

FIG. 2 further illustrates that the system 200 may be configured to receive and augment multi-modal user queries, as described further herein. The term "multi-modal" user query, as used herein, refers to a user query that includes at least a portion of one or more project details, one or more project features, one or more objectives, one or more constraints, etc. (or combinations thereof). In the example depicted in FIG. 2, a user 220 may utilize a user device 222 that includes a user interface 224 having one or more query components 226 configured to receive a query as input from the user 220. According to some embodiments, the user device 222 of FIG. 2 may correspond to the computing device 140 depicted in FIG. 1. FIG. 2 illustrates that the user device 222 may be configured to pass query data 228 associated with the query received from the user 220 to a user query multi-modality resolver 230. According to some aspects, the input modalities can be static text, image, video, streaming video, audio, etc. In cases where the input modalities include one or more non-textual input modalities, various mechanisms may be used to translate such information into text equivalent. For example, the user query multi-modality resolver 230 may include one or more adapters (not shown in the simplified example depicted in FIG. 2) utilized to convert a non-textual input modality into running text, such as audio extractors, image parsers, speech-to-text converters, and so on.

In the example depicted in FIG. 2, the system 200 includes a query engine 250 that includes one or more augmentation components 252 and one or more manipulation components 254. The augmentation component(s) 252 of the query engine 250 may be configured to generate an augmented query, as described further herein. The manipulation component(s) 254 of the query engine 250 may be configured to perform various additional operations, as further described herein, after the augmented query has been generated by the augmentation component(s) 252.

In some embodiments, a query received from the user 220 via the user interface 224 may be augmented via "implicit" augmentation in which no explicit information is provided to the user 220. To illustrate, current project details for the user 220 (such as project name, description etc.) may be extracted from one or more corporate databases, a configuration management database (CMDB), other inputs (including manually provided ones), or combinations thereof. For such an "implicit" augmentation process, FIG. 2 illustrates that the system 200 may include a user project database 232 and one or more corporate databases 234 (among other possibilities), according to some embodiments. In cases where project descriptions are available, the main keywords summarizing the project are also extracted using text summarizers, leading to "implicit" augmentation of the query received from the user 220 via the user interface 224.

In some embodiments, the query received from the user 220 via the user interface 224 may be augmented via "interactive" augmentation in which the user 220 provides information as part of the query augmentation process. To illustrate, in some aspects of the present disclosure, one or more AI-based interactive tools 240 may be used to ask questions to the user 220 in order to obtain further information over interactive channels such as live chat (utilizing one or more live chat components 242) or manual chat (utilizing one or more manual chat components 244). Information obtained over such interactive channels may add to explicit information given by the user 220 as part of the original query provided by the user 220 via the user interface 224, thereby leading to "explicit" augmentation of the original query. For such an "interactive" augmentation process, FIG. 2 illustrates that the user interface 224 may include one or more question & answer (Q&A) components 246 (for passing Q&A data 248 between the user device 222 and the one or more AI-based interactive tools 240), according to some embodiments. Thus, in some cases, the original query received from the user 220 via the user interface 224 may be augmented with its extracted project context and other details obtained based on the Q&A data 248.

As a first working example, the user 220 may provide a textual user query as input to the system 200 via the user interface 224 of the user device 222. The textual user query may correspond to "I want to plan a roll out of training on generative AI tools for software developers engaged in ML projects" (subsequently referred to herein simply as "the textual user query"). The user device 222 may pass the textual user query as the query data 228 to the user query multi-modality resolver 230. Based on the query data 228 including the textual user query, the user query multi-modality resolver 230 may extract the role "software developer", the work-thread "ML", and the type of tools "generative tools" (that collectively form an example of a "query context") from the textual user query using various extraction techniques. The manipulation component(s) 254 of the query engine 250 may include an intermediate step extractor (not shown in the simplified example depicted in FIG. 2), which may be configured to pass the augmented query through one or more Generative AI (Gen AI) tools 256 in order to break up the augmented query into intermediate steps. FIG. 2 illustrates that the generative AI tool(s) 256 may be accessible via a network 258, in some cases. To illustrate, with respect to the first working example, for the work-thread "ML", the query engine 250 may invoke a particular Gen AI tool of the Gen AI tool(s) 256 (such as OpenAI, ChatGPT, Bard, etc.) with a query around "generative tools for ML". Responsive to receiving a first query response from the particular Gen AI tool of the Gen AI tool(s) 256, the intermediate step extractor (not shown in FIG. 2) of the manipulation component(s) 254 of the query engine 250 may analyze the first query response to identify a set of intermediate steps (in this case, learning areas) that contain technical focus areas such as "recurrent neural networks", "variational autoencoders", "deep reinforcement learning", and so on.

Responsive to identifying the intermediate steps associated with the augmented query based on a query response received from the Gen AI tool(s) 256, the intermediate step extractor may be configured to perform additional manipulation operations for each individual intermediate step. For example, the intermediate step extractor may be configured to further analyze each individual intermediate step in order to extract attributes/objects/objectives that may be present in the corresponding text. As another example, the intermediate step extractor may be configured to detect action items that may be present in the corresponding text (e.g., verbs, verb phrases, or clauses that include at least a subject, an object, and a verb).

Referring back to the first working example, for a particular intermediate step corresponding to "variational autoencoders" received in the first query response, the query engine 250 may invoke a particular Gen AI tool of the Gen AI tool(s) 256 (such as OpenAI, ChatGPT, Bard, etc.) with a query around "variational autoencoders". A second query response (e.g., from ChatGPT) may correspond to the following clause: "Variational Autoencoders (VAEs): VAEs are probabilistic models that learn to encode and decode data. They are often used for generating new samples similar to the training data. VAEs have applications in image generation, anomaly detection, and representation learning." Responsive to receiving the second query response, the intermediate step extractor (not shown in FIG. 2) of the manipulation component(s) 254 of the query engine 250 may analyze the second query response to determine that the attributes for the particular intermediate step ("variational autoencoders") are "probabilistic models", "encode data", and "decode data" and that the action is "learn". According to some embodiments, these attributes may be further expanded into sub-intermediate steps using a recursive expansion, as described further herein. In the process, a relationship structure is extracted in the form of a relationship graph, using each name (e.g., VAE) as a first-level child node, each entity within that as attributes/objects/objectives (e.g., probabilistic models, encode data, decode data), each action as an edge label (e.g., learn) and going as deep into the recursion as appropriate for the example at hand.

The manipulation component(s) 254 of the query engine 250 may include a pseudo-index creator (not shown in the simplified example depicted in FIG. 2), which may be configured to perform various indexing operations, as described further herein. For example, the pseudo-index creator may be configured to perform, for a given augmented query and each underlying intermediate step associated with the given augmented query, a multi-level pseudo-indexing process substantially similar to the indexing mechanism previously described herein with respect to the initial "bootstrapping" process. However, unlike the previously described "bootstrapping" process, the indices associated with this multi-level pseudo-indexing process are not yet added to the main index stored at the database(s) 208, and the extracted entities (intermediate steps, attributes/objects/ objectives and action items) are also not yet added to the main index stored at the database(s) 208. Instead, both the indices and the extracted entities are retained in a temporary storage. According to some embodiments, each attribute/object/objective and/or action step may be recursively passed through this step (e.g., passed through the Gen AI tool(s) 256 and so on), up to a number of iterations in some cases or, in other cases, up to a point where the terminologies present in the response are all present in a given basic domain knowledge dictionary (and any term-noun or verb- absent in that dictionary is treated as a recursion candidate and taken through the recursive process). Subsequently, the four indices (as previously described herein) are built using the relationship structure thus formed, and the indices may subsequently utilized to perform an index-based matching process, as described further herein.

In the example depicted in FIG. 2, the system 200 includes a query-record mapping search engine 260 that may be configured to perform various operations. For example, using the indices formed from the augmented user query, an index matching process may be triggered, thereby resulting in a search process within the graph database 210 (stored at the one or more databases 208) constructed so far. The search process may happen at different levels of the hierarchy, such as project names, intermediate steps, attributes/objects/objectives, and action items. Such a search process may give entities higher up in the hierarchy an implicitly higher likelihood to score higher (e.g., intermediate steps are likely to score higher than attributes/object/objectives) as long as the match levels are similar, which may lead to more wholesome retrievals.

The query-record mapping search engine 260 may be configured to match the four indices as further described herein. According to some embodiments, the primary index may be matched by simply comparing the names of the extracted entities with the ones found in the corresponding index (stored at the database(s) 208 as part of the project name information 212). To illustrate, with respect to the first working example above, VAE, probabilistic model, encode data, decode data, etc. are matches, and additional attributes are matched such as encoder, decoder, etc. that were obtained by the recursion. According to some embodiments, a total match score may be returned as a count of the number of entities that match (e.g., that are present at least once in both the augmented user query and the graph database 210), and the total match score may be normalized between 0 and 1 for unification. According to some embodiments, the pseudo-sentence embedding index may match the embedding of the sentence created by "VAE probabilistic model encode data decode data encoder decoder" (note, the pseudo-sentence may be formed by breadth-first expansion of the attributes fetched by the recursion). According to some embodiments, the average word embedding index may match the independent terms "VAE", "probabilistic models", "encode data", "decode data", "encoder", "decoder" etc. and similarly for the subgraph index, with similar normalization. Each of the past work-threads that match inside the knowledge graph are thus retrieved, along with the tools used for those, that match with the individual tasks.

According to some embodiments, the pseudo-sentence embedding index may treat the input augmented query as a sentence, find the best match (and in another embodiment, may treat the raw text input as a sentence and find the best match) as the shortest distance (stored at the database(s) 108 as part of the sentence embedding information 216), and return the inverse distances of each entity with the query (which may be normalized between 0 and 1, with 1 indicating a higher match). According to some embodiments, the average word embedding index may be similarly constructed from the input augmented query and searched for index-match (stored at the database(s) 208 as part of the word embedding information 218), with a similar normalization convention followed. According to some embodiments, a similar process may be followed for the subgraph index, whereby the subgraph index may be similarly constructed from the input augmented query and searched for index-match (stored at the database(s) 208 as part of the subgraph information 214), with a similar normalization convention followed. In each case, the entity may also be returned. For each entity, an average score (in some cases, or a total score in other cases) is computed across all the indices, and this average/total score may be sorted with a higher number indicating a better match.

In the example depicted in FIG. 2, the system 200 includes a matching work record ranked retrieval engine 262 that may be configured to perform various operations. According to some embodiments, work-records are retrieved such that the work-records associated with the higher-scoring entities are returned as the upper-rankers. The system 200 depicted in the example of FIG. 2 also includes tool chain set records 264 and a tool engine 270. FIG. 2 illustrates that, according to some embodiments, the tool engine 270 may include various components, such as one or more matching components 272, one or more ranking components 274, and one or more scoring components 276.

With respect to tool chain composition and recording, the tool engine 270 may be configured to compute a function using: (a) prior user experience (UX) scores 278 of each of these tools given the task recorded in the system; (b) quality score of the solution using these tools (referred to herein as a "tool effectiveness score"), if such a score is available (else a bootstrapping mechanism may be used, as described further herein); and (c) the match score of work-records. According to some embodiments, the tool engine 270 may be configured to return the best-scoring tools to the user 220, as described further herein.

As previously noted, in cases where the "tool effectiveness score" is unavailable, an example of a bootstrapping mechanism that may be utilized is further described herein. To illustrate, in cases where no prior tool is found to be used for a given task, then the description of the tool's work is matched with the task description and/or work-record average word embedding index (stored at the database(s) 208 as part of the word embedding information 218) and/or work-record pseudo-sentence embedding index (stored at the database(s) 208 as part of the sentence embedding information 216), using word embedding distance computation, or text semantic similarity measurement mechanisms, or any other known technique (or a function of any one, two or three of these three factors). In some embodiments, the top-k tools are chosen for each task where k is a user-given number, expressed as a count, or a match threshold.

In some embodiments, the tool effectiveness score may be available but a tool usage confidence score may be less than a given threshold (where such a tool usage confidence score may be calculated by multiplying a number of times that the tool has been used by the tool effectiveness score, in some cases). In such cases where the tool usage confidence score fails to satisfy the given threshold, then the description of the tool's work is matched with the task description and/or work-record average word embedding index (stored at the database(s) 208 as part of the word embedding information 218) and/or work-record pseudo-sentence embedding index (stored at the database(s) 208 as part of the sentence embedding information 216), using word embedding distance computation, or text semantic similarity measurement mechanisms, or any other known technique (or a function of any one, two or three of these three factors). In some embodiments, the top-k tools are chosen for each task where k is a user-given number, expressed as a count, or a match threshold.

According to some embodiments, the tool engine 270 may be configured to return the tool set used by the work-record with the best-match score (and the chain used by this tool set) to the user 220, such as via an output engine 280 (as further described herein). According to some embodiments, in the case of partial matches, the tool engine 270 may be configured to return partially matching tool sets to the user 220, such as via the output engine 280 (as further described herein). In some cases, for such partial matches, the matching portions may be over different sub-parts of an earlier work (e.g., some intermediate steps match, some action items or attributes/object/objectives match, etc.). In such cases, the tool engine 270 may be configured to return the tool sets (and chains too) solving those subproblems to the user 220, such as via the output engine 280 (as further described herein). According to some embodiments, the user interface 224 of the user device 222 may be configured to allow the user 220 to arrange such tool sets and/or chains in appropriate partial order, and the user 220 may have the ability to compose the rest of the solution using traditional mechanisms.

Referring to FIG. 2, the output engine 280 may be configured to perform various operations, as described further herein. FIG. 2 illustrates that the output engine 280 may be configured to receive one or more outputs generated by the tool engine 270, where the output(s) correspond to the various alternative scenarios previously described herein with respect to the operations performed at the tool engine 270. In the simplified example depicted in FIG. 2, the output engine 280 may be configured to store such output(s) received from the tool engine 270 such as tool set/chain information 282, according to some embodiments. Alternatively or additionally, the output(s) received at the output engine 280 from the tool engine 270 may correspond to one or more case of use scores 284 and/or one or more tool effectiveness scores 286, among other possibilities as further described herein. The output engine 280 may be configured to generate an output represented in FIG. 2 as a solution 288 and to send the solution 288 to the user device 222. In the example depicted in FIG. 2, the user device 222 may include one or more evaluation components 248 that may be configured to display the solution 288 via the user interface 224, thereby providing the user 220 with the opportunity to review the solution 288 and/or elect to use the solution 288 (in some cases), among other possible user options.

According to some embodiments, in cases where the user 220 elects to use the solution 288 (which, in some cases, may be determined by the evaluation component(s) 248 based on user input(s) received from the user 220 via the user interface 224), such usage information (identified as usage data 290 in FIG. 2) may be noted to the records and index, thereby ingraining the ongoing gained knowledge into the system 200 (this creates an element of the form of case of use). In some embodiments, the user 220 may be able to enter the success obtained by utilizing the solution 288 (identified as feedback 292 in FIG. 2) at the end of the work (e.g., via user input(s) into success input field(s) generated by the evaluation component(s) 248 for display via the user interface 224), in order to enrich the system 200 further with such ongoing gained knowledge.

According to some embodiments, in cases where the user 220 does not elect to use the solution 288 and instead uses a new solution (which, in some cases, may be determined by the evaluation component(s) 248 based on user input(s) received from the user 220 via the user interface 224), such usage of the new solution (identified as usage data 290 in FIG. 2) may be utilized to enrich the system 200 further with such ongoing gained knowledge. According to some embodiments, this new solution (that is different from the solution 288 proposed to the user 220) may be utilized in a manner similar to one of the historical work records 202 utilized in the bootstrapping phase previously described herein, such that the new solution may be added to the work-records and a new index may be created.

According to some embodiments, the quality of the solution 288 generated according to the various processes described herein may be measured and recorded post-implementation quantitatively. The quality of the solution 288 (also referred to herein as the "tool effectiveness score") may be computed as a function of one or more of: a total time taken by humans (including but not limited to the user 220 depicted in FIG. 2) to embed the tools' outputs into the overall solution; a total time taken by humans to solve intermediate steps and the overall task; and a numerical value (as given by a domain expert or via some external mechanism) of the quality of expertise of humans in building the rest of the solution as well as in consuming the tool output. In each case, one or more of: (i) job roles of the humans involved in the solution development; (ii) task (pattern); (iii) Gen AI pattern(s); and (iv) work-thread (productivity node) may also be noted against the score given to the tool by the user 220 (to build up the context of the score).

In some embodiments, a "relative performance matrix" may also be generated (not shown in the simplified example depicted in FIG. 2) by performing various operations, as described further herein. As an example of a first set of operations, for one or more of (a) each work-thread (productivity node), (b) each job/user role, (c) ADM task and (d) each task (Gen AI pattern), any one of the work records may be utilized as a baseline. According to some embodiments, the work record utilized as the baseline may be assigned a "normalized" tool effectiveness score of one. In some cases, the baseline work record may be one of the historical work records 202 that was available during the "bootstrapping" phase. In other cases, such as if such a historical work record is unavailable, then any other entry may be selected randomly, and this work record may be identified as the "random pivot element" as described further herein. As an example of a second set of operations, all the tool effectiveness score entries for the same (e.g., one or more of each task, each job role, each Gen AI pattern, similar to the first set of operations) may be normalized using a division operator, where the numerator represents its tool effectiveness score and the denominator represents the tool effectiveness score of the previously-identified random pivot element. As an example of a third set of operations, entries with higher normalized tool effectiveness scores may be identified as those that are more suitable for the task for that job role and that Gen AI pattern.

In some embodiments, a set of toolchains may be recommended such that the value of a function of tool effectiveness score and ease of use is maximized, with a simple example of such a function being multiplication.

Thus, the system 200 depicted in FIG. 2 represents exemplary aspects of an example of a system that supports intelligent re-use of knowledge across an organization using a natural text-based querying framework, according to one or more aspects of the present disclosure.

Figure 3:
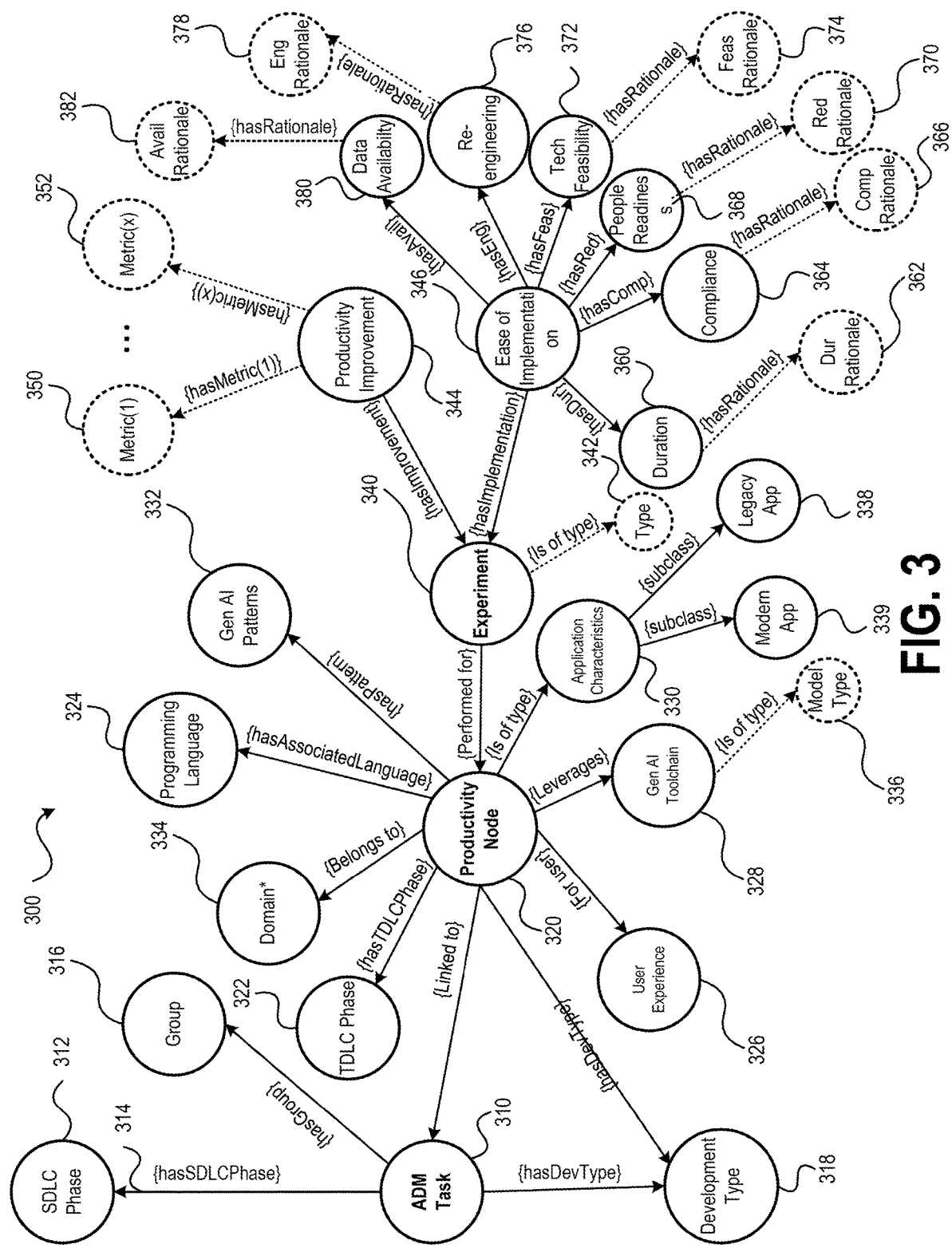
FIG. 3 a block diagram of an example of a knowledge graph according to one or more aspects of the present disclosure.

Referring to FIG. 3, a diagram depicts an example of a knowledge graph 300 according to one or more aspects of the present disclosure. The knowledge graph 300 depicted in FIG. 3 represents an example in which the query context and productivity nodes (work-threads) are already known and structurally mapped onto the KG graph entries present. In such cases, the corresponding entries inside the knowledge graph 300 may be selected for use, instead of following the above-described steps for retrieval in cases where the query context and productivity nodes are unknown.

Referring back to the first working example previously described herein with respect to FIG. 2, the user 220 may provide a textual user query as input to the system 200 via the user interface 224 of the user device 222. The textual user query may correspond to "I want to plan a roll out of training on generative AI tools for software developers engaged in ML projects" (subsequently referred to herein simply as "the textual user query"). As described further herein, the query received from the user 220 may be augmented via "implicit" augmentation in which no explicit information is provided to the user 220. The user device 222 may pass the textual user query as the query data 228 to the user query multi-modality resolver 230. Based on the query data 228 including the textual user query, the user query multi-modality resolver 230 may extract the role "software developer", the work-thread "ML", and the type of tools "generative tools" (that collectively form an example of a "query context") from the textual user query using various extraction techniques. As an example of "implicit" augmentation, the user query multi-modality resolver 230 may extract current project details for the user 220 (such as information associated with a project name where the phase of development is delivery, information associated with project description, or a combination thereof) from the user project database 232 and may extract the role of the user 220 as a software developer from the corporate database(s) 234. In this example, the role of the user 220 is a "software developer", the phase of development as "delivery" for the project name, and productivity nodes (work-threads) are already known and structurally mapped onto the knowledge graph entries present in the graph database 210. That is, the query context and the productivity nodes (work-threads) are already known. According to some embodiments, the textual user query may result in selecting the corresponding entries inside the knowledge graph being selected for use, instead of following the above steps for retrieval where these are not known. The sets of tool chains used in these work-threads may be shortlisted for downstream processing. In this example, since the role is "software developer", the phase of development (such as "delivery"), and the typical tools that a software developer uses for "ML" are also available in the knowledge graph. In some embodiments, this information in the knowledge graph may be used in case the query context and productivity nodes (work-threads) are already known. The tool effectiveness score for each of the tools retrieved from the historical knowledge stored inside the instantiated knowledge graph, and the top-k tools (e.g., where k=3) are retrieved for each task. Taking the work-thread with the lowest-valued tool effectiveness score as the pivot, the normalized tool effectiveness score is computed for each work-thread, by dividing the tool effectiveness score of that work-thread with that of the pivot work-thread, and thereby computing the relative performance matrix. In an embodiment, the relative performance matrix is returned to the querying user 220, to provide a relative effectiveness of the different Gen AI tools that software developers intending to enhance ML skills need to be trained for. In another embodiment, a sorted list of work-threads are returned, with the sorting based on tool effectiveness score values, such that the higher values are presented (according to some preferred embodiments) as the preferred approaches. In yet another embodiment, a sorted list of work-threads is returned to the user 220, with the sorting based on a function of the retrieved ease of use and tool effectiveness score values, such as a multiplication product.

As an illustrative example, a role of a user (e.g., the user 220 of FIG. 2) may correspond to a software developer, a phase of development may correspond to a delivery phase, and the typical tools that a software developer uses for machine learning (ML) are also available in the knowledge graph 300. As such, the knowledge graph 300 depicted in FIG. 3 represents a non-limiting, illustrative example of a knowledge graph that may be selected for use (instead of following above-described steps for retrieval) when the query context and productivity nodes (work-threads) are already known.

The knowledge graph 300 depicted in FIG. 3 includes a node identified as ADM Task 310, corresponding to a granular level of software delivery tasks performed for a particular SDLC phase 312. In FIG. 3, edge 314 indicates a semantic relationship between the nodes 310, 312, namely, that the particular ADM task (e.g., a software delivery task) represented by the node 310 is performed as part of the particular SDLC phase (e.g., delivery) represented by the node 312, as indicated by the label "hasSDLCPhase" associated with the edge 314.

The knowledge graph 300 depicted in FIG. 3 includes a node identified as Group 316. In FIG. 3, the edge indicates a semantic relationship between the nodes 310, 316, as indicated by the label ("{hasGroup}") associated with the edge. The knowledge graph 300 depicted in FIG. 3 includes a node identified as Development Type 318. In FIG. 3, the edge indicates a semantic relationship between the nodes 310, 318, as indicated by the label ("{hasDevType}") associated with the edge.

The knowledge graph 300 depicted in FIG. 3 includes a node identified as Productivity Node 320, corresponding to a combination of TDLC activity and platform/technology/programming language that represents a discrete work segment type for applying Gen AI. TDLC means various technology phases and activities across the software delivery lifecycle. It is a super set of traditional SDLC in the era of Gen AI and human augmented software development. In the knowledge graph 300 depicted in FIG. 3, the dimensions of the productivity node 320 include: Development Type 318; TDLC Phase 322; Programming Language 324; User Experience 326; Gen AI toolchain 328; Application Characteristics 330; and Gen AI patterns 332. According to some embodiments, the dimensions of the productivity node 320 may further include Domain 334.

In FIG. 3, edges indicate semantic relationships between the nodes 310 and each of nodes 322-334, as indicated by the corresponding labels associated with a given edge. In FIG. 3, one edge indicates a semantic relationship between the nodes 320, 322, as indicated by the label ("{hasTDLCPhase}") associated with the edge. Gen AI patterns 332 represent the patterns which help perform different types of activities like Generation, Completion, Synthesis, Analysis, Summarization, Sentiment Analysis, Remediation, Segmentation, Translation, Question Answering, Classification. In FIG. 3, one edge indicates a semantic relationship between the nodes 320, 324, as indicated by the label ("{hasProgrammingLanguage}") associated with the edge. In FIG. 3, one edge indicates a semantic relationship between the nodes 320, 326, as indicated by the label ("{For user}") associated with the edge. In FIG. 3, one edge indicates a semantic relationship between the nodes 320, 328, as indicated by the label ("{Leverages}") associated with the edge. In FIG. 3, one edge indicates a semantic relationship between the nodes 320, 330, as indicated by the label ("{Is of type}") associated with the edge. Application Characteristics 330 may correspond to a legacy application type 338 versus a modern application type 339. In FIG. 3, edges indicates semantic relationship between the nodes 330 and 338, 339, as indicated by the label ("{subclass}") associated with the edges. In FIG. 3, one edge indicates a semantic relationship between the nodes 320, 332, as indicated by the label ("{hasPattern}") associated with the edge. In FIG. 3, one edge indicates a semantic relationship between the nodes 320, 334, as indicated by the label ("{Belongs to}") associated with the edge.

The knowledge graph 300 depicted in FIG. 3 includes a node identified as Experiment 340. In FIG. 3, one edge indicates a semantic relationship between the nodes 340, 320, as indicated by the label ("{Performed for}") associated with the edge. In FIG. 3, the knowledge graph 300 includes a node identified as Type 342, with a corresponding edge indicating a semantic relationship between the nodes 340, 342 identified by the label ("{Is of type}"). In FIG. 3, the knowledge graph 300 includes nodes identified as Productivity Improvement 344 and Ease of Implementation 346, with corresponding edges indicating a semantic relationship between the nodes 340 and 344, 346 identified by the labels ("{hasImprovement}" and "{hasImplementation}").

With respect to the node identified as Productivity Improvement 344, the knowledge graph 300 depicted in FIG. 3 includes nodes identified as Metric (1) 350 through Metric (x) 352. According to some embodiments, examples of such metrics may include: Talent Effectiveness; Developer Satisfaction; Efficiency Gain; Speed to Value; and Quality Improvement. With respect to the node identified as Ease of Implementation 346, the knowledge graph 300 depicted in FIG. 3 illustrates that the associated dimensions are: Duration 360; Compliance 364; People Readiness 368; Tech Feasibility 372; Re-Engineering 376; and Data Availability 380. With respect to the node identified as Ease of Implementation 346, corresponding edges indicating a semantic relationship between the nodes 346 and 360-380 are identified by the respective labels ("{hasDur}"; "{hasComp}"; "{hasRed}"; "{hasFeas}"; "{hasEng}"; and "{hasAvail}"). In FIG. 3, edges indicate semantic relationships between the nodes 346 and 338, 339, as indicated by the label ("{subclass}") associated with the edges.

In FIG. 3, edges indicate semantic relationships between the nodes 360-380 and each of nodes 362-382, as indicated by the corresponding labels associated with a given edge. In FIG. 3, each edge indicating a semantic relationship between the respective nodes 360 and 362, 364 and 366, 368 and 370, 372 and 374, 374 and 376, 376 and 378, and 380 and 382, as indicated by the label ("{hasRationale}") associated with the edge. In the example knowledge graph 300 depicted in FIG. 3, the nodes 362, 366, 370, 374, 378, and 382 are respectively identified as Dur Rationale 362, Compliance (Comp) Rationale 366, Readiness (Red) Rationale 370, Feasibility (Feas) Rationale 374, Engineering (Eng) Rationale 378, and Availability (Avail) Rationale 382. Thus, FIG. 3 depicts an illustrative, non-limiting example of a knowledge graph according to one or more aspects of the present disclosure.

As a second working example, referring back to FIG. 2, the user 220 may provide a textual user query as input to the system 200 via the user interface 224 of the user device 222. The textual user query may correspond to "How to write an ecommerce program using Java?" (subsequently referred to herein simply as "the textual user query"). The user device 222 may pass the textual user query as the query data 228 to the user query multi-modality resolver 230. Based on the query data 228 including the textual user query, the user query multi-modality resolver 230 may extract the role "developer" from the textual user query using various extraction techniques. The manipulation component(s) 254 of the query engine 250 may include an intermediate step extractor (not shown in the simplified example depicted in FIG. 2), which may be configured to pass the augmented query through a particular Gen AI tool of the Gen AI tool(s) 256 in order to break up the augmented query into intermediate steps. An example of a query response from the particular Gen AI tool may include "To write an e-commerce program using Java, you'll need to follow a series of steps . . . " and a high-level overview of a process that identifies twelve steps. Each the twelve steps included in the query response may be labeled as an intermediate step, having attributes/objects/objectives. For example, in the query response, the twelfth step may correspond to "Deploy the application: Choose a web server (e.g., Apache Tomcat, Jetty) to deploy your application. Package your Java code, HTML, CSS, and JavaScript files into a WAR (Web Application Archive) file and deploy it to the server." This twelfth step has a name "Deploy the application", objects such as web server, Apache Tomcat, Jetty, Application, Java Code, HTML, CSS, JavaScript files, WAR, server, etc. and actions such as choose, deploy, package, etc.

Figure 4:
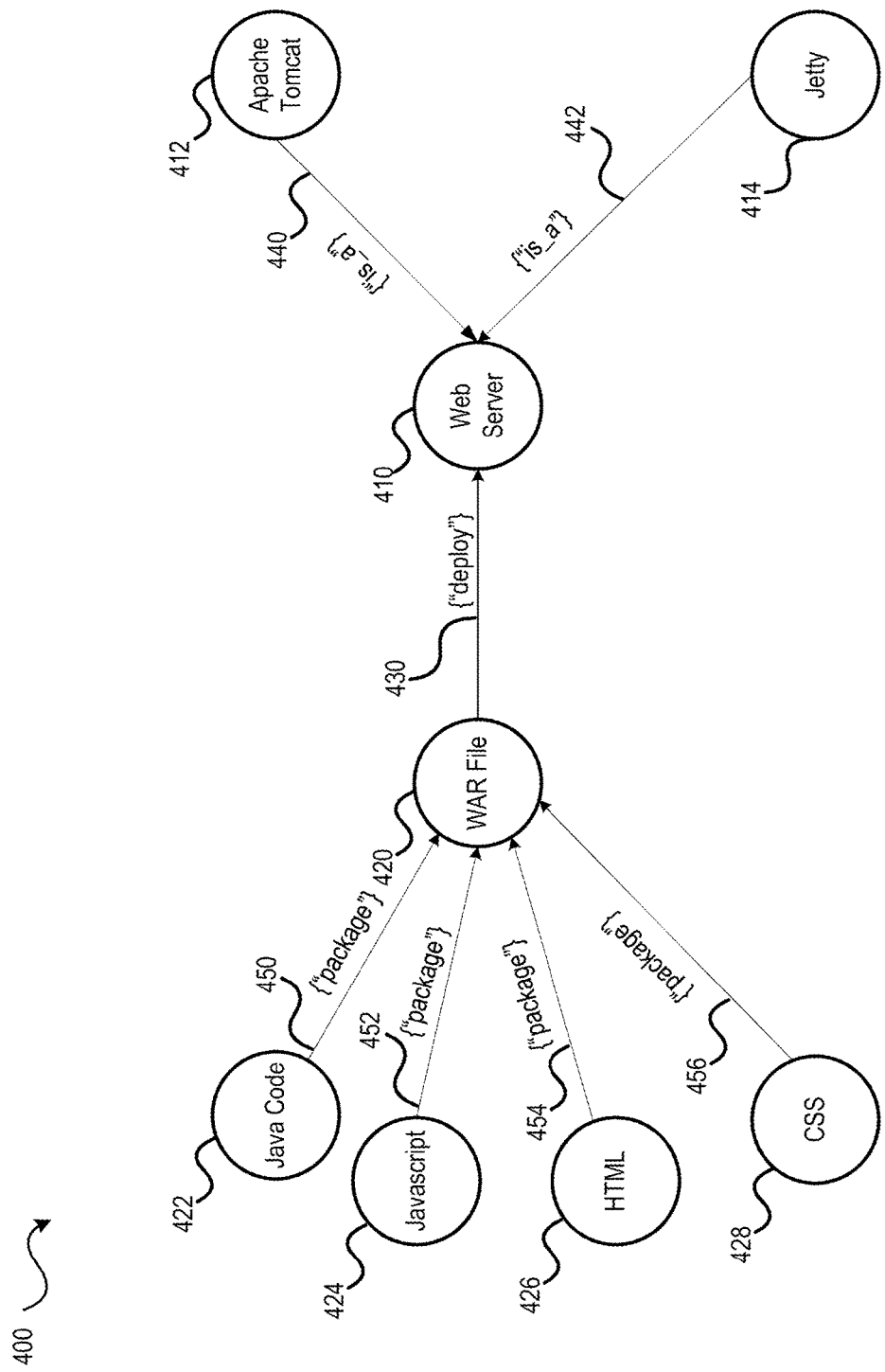
FIG. 4 is a block diagram of a subgraph constructed based on a particular portion of a query response from a generative AI tool, according to one or more aspects of the present disclosure.

Forming an actual knowledge graph from this extraction may be carried out using various techniques. For instance, converting the twelfth step described above to a subgraph may yield a graph akin the example shown in FIG. 4, which shows a block diagram of an exemplary subgraph 400 constructed based on a particular portion of a query response from a generative AI tool, according to one or more aspects of the present disclosure. In FIG. 4 nodes 410, 412, 414, 420, 422, 424, 426, and 428 each correspond to one of the objects, respectively identified as "Web Server", "Apache Tomcat", "Jetty", "WAR file", "Java Code", "JavaScript", "HTML", and "CSS". With respect to the nodes identified as Web Server 410 and WAR file 420, an edge 430 indicates that a semantic relationship between the nodes 410, 420 corresponds to one of the actions (identified by the label "{deploy}"). With respect to the node identified as Web Server 410, edges 440, 442 indicating that the semantic relationships between the nodes 410 and 412, 414 are each identified by the label "{"is_a"}" in FIG. 4. That is, the action "choose" corresponds to selection of a particular type of web server as either an Apache Tomcat web server or a Jetty web server. With respect to the node identified as WAR file 420, edges 450, 452, 454, 456 indicate that a semantic relationship between the nodes 420 and 422, 424, 426, 428 corresponds to another one of the actions (with each of the edges 450, 452, 454, 456 identified by the label "{package}"). That is, the action "package" corresponds to the packaging of Java Code (node 422), JavaScript (node 424), HTML (node 426), and CSS (node 428) into a WAR file (node 420).

Figure 5:
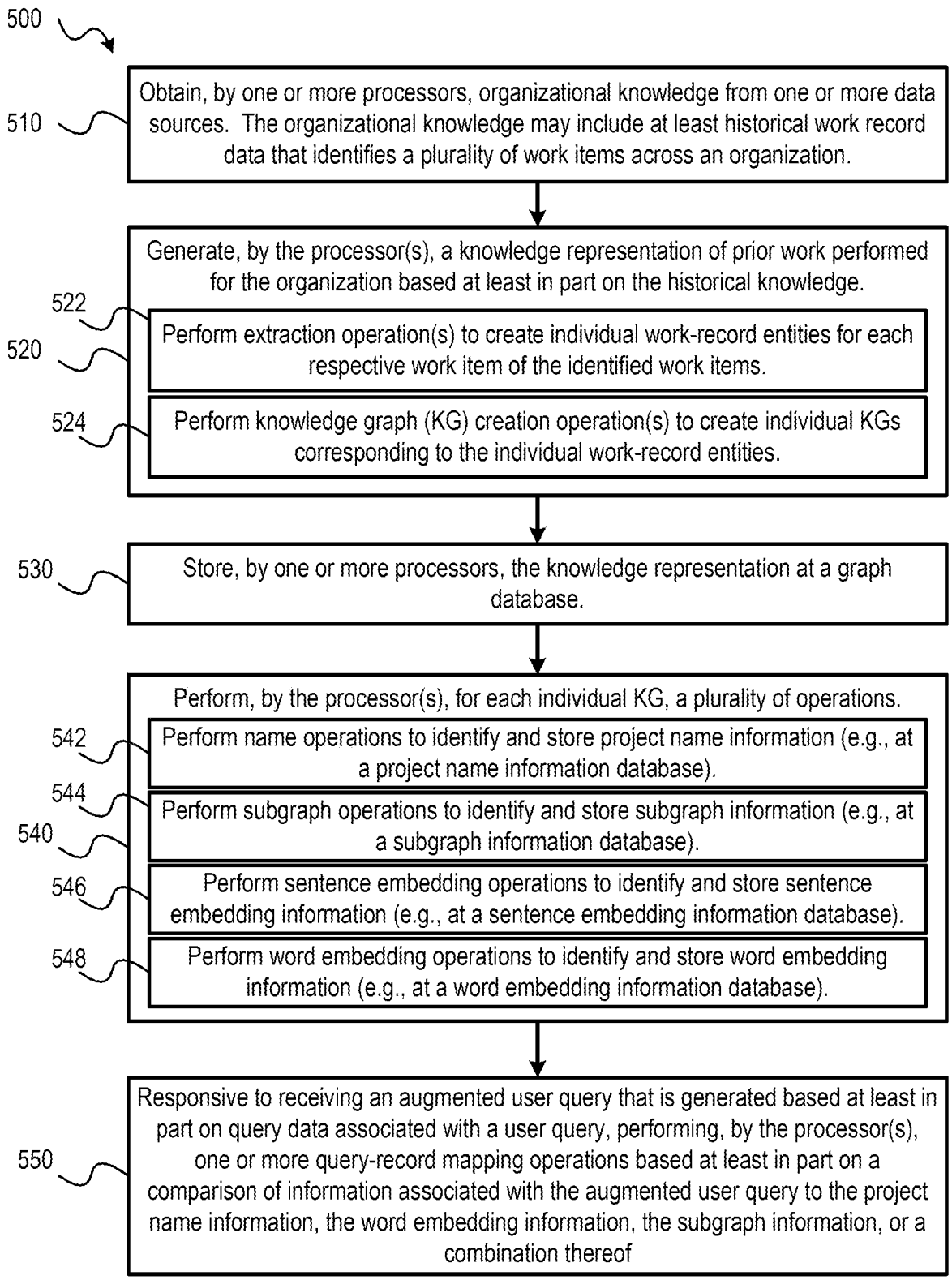
FIG. 5 is a flow diagram illustrating an example of a method for intelligent re-use of knowledge across an organization using a natural text-based querying framework, according to one or more aspects of the present disclosure.

Referring to FIG. 5, a flow diagram of an example of a method for intelligent re-use of knowledge across an organization using a natural text-based querying framework according to one or more aspects is shown as a method 500. In some implementations, the operations of the method 500 may be stored as instructions that, when executed by one or more processors (e.g., the one or more processors of a computing device or a server), cause the one or more processors to perform the operations of the method 500. In some implementations, the method 500 may be performed by a computing device, such as the computing device 110 of FIG. 1 (e.g., a computing device configured for intelligently re-using knowledge using a natural text-based querying framework), the computing device 140 of FIG. 1 (e.g., similar to the user device 222 of FIG. 2), the cloud-based system 152 of FIG. 1, other devices, or a combination thereof.

The method 500 includes obtaining, by one or more processors, organizational knowledge from one or more data sources, at step 510. The organizational knowledge may include at least historical work record data that identifies a plurality of work items across an organization. For example, referring to FIG. 2, the organizational knowledge may include at least the historical work records 202, as described further herein with respect to FIG. 2.

The method 500 includes generating, by the processor(s), a knowledge representation of prior work performed for the organization based at least in part on the organizational knowledge, at step 520. FIG. 5 illustrates that the step 520 of generating the knowledge representation may include performing one or more extraction operations to create individual work-record entities for each respective work item of the identified work items, at step 522. FIG. 5 illustrates that the step 520 of generating the knowledge representation may also include performing one or more knowledge graph creation operations to create individual knowledge graphs corresponding to the individual work-record entities, at step 524. For example, referring to FIG. 2, as part of generating the knowledge representation, the work record engine 204 may perform one or more extraction operations to create individual work-record entities for each respective work item of the identified work items (e.g., stored as the historical work records 202), as described further herein with respect to FIG. 2. As another example, referring to FIG. 2, as part of generating the knowledge representation, the knowledge graph engine 206 may perform one or more knowledge graph creation operations to create individual knowledge graphs corresponding to the individual work-record entities, as described further herein with respect to FIG. 2.

The method 500 includes storing, by the processor(s), the knowledge representation at a graph database, at step 530. For example, referring to FIG. 2, the knowledge graph engine 206 may store the knowledge representation at the graph database 210 of the one or more databases 208, as described further herein with respect to FIG. 2.

The method 500 includes performing, by the processor(s), for each individual knowledge graph, a plurality of operations, at step 540. FIG. 5 illustrates that the plurality of operations associated with the step 540 of generating the knowledge representation may include performing name operations to identity and store project name information (e.g., at a project name information database), at step 542. For example, referring to FIG. 2, the knowledge graph engine 206 may perform such operations for each individual knowledge graph, as described further herein with respect to FIG. 2. To illustrate, for each individual knowledge graph, the knowledge graph engine 206 of FIG. 2 may perform name operations to identity and store the project name information 212 (e.g., at a project name information database). FIG. 5 illustrates that the plurality of operations may include performing subgraph operations to identify and store subgraph information (e.g., at a subgraph information database), at step 544. To illustrate, for each individual knowledge graph, the knowledge graph engine 206 of FIG. 2 may perform subgraph operations to identity and store the subgraph information 214 (e.g., at a subgraph information database). FIG. 5 illustrates that the plurality of operations may include performing sentence embedding operations to identify and store sentence embedding information (e.g., at a sentence embedding information database), at step 546. To illustrate, for each individual knowledge graph, the knowledge graph engine 206 of FIG. 2 may perform sentence embedding operations to identity and store the sentence embedding information 216 (e.g., at a sentence embedding information database). FIG. 5 illustrates that the plurality of operations may include performing word embedding operations to identify and store word embedding information (e.g., at a word embedding information database), at step 548. To illustrate, for each individual knowledge graph, the knowledge graph engine 206 of FIG. 2 may perform word embedding operations to identity and store the word embedding information 218 (e.g., at a word embedding information database).

The method 500 includes performing, by the processor(s), one or more query-record mapping operations responsive to receiving an augmented user query, at step 550. The augmented user query may be generated based at least in part on query data associated with a user query, and the query-record mapping operations may be performed based at least in part on a comparison of information associated with the augmented user query to the project name information, the sentence embedding information, the word embedding information, the subgraph information, or a combination thereof. For example, referring to FIG. 2, the user 220 may provide a user query via the user interface 224 of the user device 222, and the user device 222 may pass the query data 228 associated with the user query to the user query multi-modality resolver 230. As described further herein, in some implementations, the query augmentation process may be an implicit augmentation process or an explicit augmentation process (including optional interactive augmentation based on Q&A data 248 between the user 220 and the AI-based interactive tools 240, in some cases). The query engine 250 of FIG. 2 may include augmentation component(s) 252 and manipulation component(s) 254 to generate the augmented user query (e.g., by utilizing the Gen AI tool(s) 256, in some cases). The query-record mapping search engine 260 depicted in FIG. 2 may receive the augmented user query generated by the query engine 250. The query-record mapping search engine 260 may perform query-record mapping operations based at least in part on a comparison of information associated with the augmented user query to the project name information 212, the sentence embedding information 214, the word embedding information 216, the subgraph information 218, or a combination thereof (each stored at the one or more databases 208).

Thus, FIG. 5 illustrates an example of a method for intelligent re-use of knowledge using a natural text-based querying framework, according to one or more aspects of the present disclosure.

It should be understood that the drawings are not necessarily to scale and that the disclosed aspects are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular aspects illustrated herein.

It is noted that other types of devices and functionality may be provided according to aspects of the present disclosure and discussion of specific devices and functionality herein have been provided for purposes of illustration, rather than by way of limitation. It is noted that the operations of the method 500 of FIG. 5 may be performed in any order. It is also noted that the method 500 of FIG. 5 may also include other functionality or operations consistent with the description of the operations of the system 100 of FIG. 1, the system 200 of FIG. 2, and the examples shown and described with reference to FIGS. 1-4.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-5 include processors, electronics devices, hardware devices, electronics components, logical circuits, memories, software codes, firmware codes, among other examples, or any combination thereof. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits, and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules, and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. In some implementations, a processor may also be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media can include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, hard disk, solid state disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, various terminology is for the purpose of describing particular implementations only and is not intended to be limiting of implementations. For example, as used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). The term "coupled" is defined as connected, although not necessarily directly, and not necessarily mechanically; two items that are "coupled" may be unitary with each other. the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified—and includes what is specified; e.g., substantially 90 degrees includes 90 degrees and substantially parallel includes parallel—as understood by a person of ordinary skill in the art. In any disclosed aspect, the term "substantially" may be substituted with "within [a percentage] of" what is specified, where the percentage includes 0.1, 1, 5, and 10 percent; and the term "approximately" may be substituted with "within 10 percent of" what is specified. The phrase "and/or" means and or.

Although the aspects of the present disclosure and their advantages have been described in detail, it should be understood that various changes, substitutions and alterations can be made herein without departing from the spirit of the disclosure as defined by the appended claims. Moreover, the scope of the present application is not intended to be limited to the particular implementations of the process, machine, manufacture, composition of matter, means, methods and processes described in the specification. As one of ordinary skill in the art will readily appreciate from the present disclosure, processes, machines, manufacture, compositions of matter, means, methods, or operations, presently existing or later to be developed that perform substantially the same function or achieve substantially the same result as the corresponding aspects described herein may be utilized according to the present disclosure. Accordingly, the appended claims are intended to include within their scope such processes, machines, manufacture, compositions of matter, means, methods, or operations.

What is claimed is:

1. A method for intelligent re-use of knowledge across an organization using a natural text-based querying framework, the method comprising:

obtaining, by one or more processors, organizational knowledge from one or more data sources, wherein the organizational knowledge includes at least historical work record data that identifies a plurality of work items across an organization;

generating, by the one or more processors, a knowledge representation of prior work performed for the organization based at least in part on the organizational knowledge, wherein generating the knowledge representation comprises performing one or more extraction operations to create individual work-record entities for each respective work item of the identified work items and performing one or more knowledge graph creation operations to create individual knowledge graphs corresponding to the individual work-record entities;

storing, by the one or more processors, the knowledge representation at a graph database;

performing, by the one or more processors, for each individual knowledge graph, a plurality of operations, the plurality of operations comprising project name operations to identify and store project name information, subgraph operations to identify and store subgraph information, sentence embedding operations to identify and store sentence embedding information, and word embedding operations to identify and store word embedding information;

performing, by the one or more processors, a query augmentation process to generate an augmented user query, wherein the query augmentation process corresponds to an implicit augmentation process and an explicit augmentation process; and responsive to receiving the augmented user query that is generated based at least in part on query data associated with a user query, performing, by the one or more processors, one or more query-record mapping operations based at least in part on a comparison of information associated with the augmented user query to the stored project name information, the stored sentence embedding information, the stored word embedding information, the stored subgraph information, or a combination thereof.

2. The method of claim 1, wherein the query augmentation process corresponds to the implicit augmentation process that utilizes information extracted from the user query in combination with additional information associated with the user that is extracted from one or more databases in order to generate the augmented user query.

3. The method of claim 1, wherein the query augmentation process corresponds to the explicit augmentation process, and wherein performing the query augmentation process comprises:
   extracting information from the user query received from a user to identify a query context;
   invoking a generative artificial intelligence (AI) tool with a query that includes at least a portion of the query context;
   analyzing a query response received from the generative AI tool in order to identify a set of intermediate steps; and
   analyzing, for each of the intermediate steps, text associated with a given intermediate step in order to extract one or more attributes, objectives, objects, action items, or any combination thereof.

4. The method of claim 3, wherein performing the one or more query-record mapping operations includes comparing results obtained by performing the query augmentation process to the stored project name information, the stored sentence embedding information, the stored word embedding information, the stored subgraph information, or a combination thereof.

5. The method of claim 4, further comprising performing, by the one or more processors, one or more matching work record ranked retrieval operations in accordance with one or more scoring models.

6. The method of claim 3, wherein the explicit augmentation process further comprises an interactive augmentation process that utilizes one or more AI-based interactive tools to obtain additional information from the user in order to further augment the user query received from the user.

7. The method of claim 1, further comprising performing, by the one or more processors, one or more tool identification operations based at least in part on tool effectiveness scores associated with a plurality of tools, wherein an individual tool effectiveness score associated with a given tool is calculated based at least in part on one or more prior user experience scores associated with the given tool.

8. The method of claim 7, further comprising determining, by the one or more processors, at least one recommended tool for a given task based at least in part on a relative tool effectiveness score for the given task.

9. The method of claim 8, providing information associated with the at least one recommended tool to a user associated with the user query via a user interface.

10. A system for intelligent re-use of knowledge across an organization using a natural text-based querying framework, the system comprising:
    a memory; and
    one or more processors communicatively coupled to the memory, the one or more processors configured to:
    obtain organizational knowledge from one or more data sources, wherein the organizational knowledge includes at least historical work record data that identifies a plurality of work items across an organization;
    generate a knowledge representation of prior work performed for the organization based at least in part on the organizational knowledge, wherein generating the knowledge representation comprises performing one or more extraction operations to create individual work-record entities for each respective work item of the identified work items and performing one or more knowledge graph creation operations to create individual knowledge graphs corresponding to the individual work-record entities;
    store the knowledge representation at a graph database;
    perform, for each individual knowledge graph, a plurality of operations, the plurality of operations comprising project name operations to identify and store project name information, subgraph operations to identify and store subgraph information, sentence embedding operations to identify and store sentence embedding information, and word embedding operations to identify and store word embedding information;
    perform a query augmentation process to generate an augmented user query, wherein the query augmentation process corresponds to an implicit augmentation process and an explicit augmentation process; and
    responsive to receiving the augmented user query that is generated based at least in part on query data associated with a user query, perform one or more query-record mapping operations based at least in part on a comparison of information associated with the augmented user query to the project name information, the sentence embedding information, the word embedding information, the subgraph information, or a combination thereof.

11. The system of claim 10, wherein the query augmentation process corresponds to the explicit augmentation process, the one or more processors configured to:
    receive the user query from a user;
    provide the user query as the query data to a user query multi-modality resolver configured to extract information corresponding to a query context;
    invoke a generative artificial intelligence (AI) tool with a query that includes at least a portion of the query context;
    analyze a query response received from the generative AI tool in order to identify a set of intermediate steps;
    analyze, for each of the intermediate steps, text associated with a given intermediate step in order to extract one or more attributes, objectives, objects, action items, or any combination thereof; and
    using a recursive expansion, further expand each individual attribute into sub-intermediate steps.

12. The system of claim 10, wherein the query augmentation process corresponds to the implicit augmentation process, the one or more processors configured to:
    receive the user query from a user;
    extract information from the user query;
    extract additional information associated with the user from a user project database, one or more corporate databases, or a combination thereof; and
    utilize the information extracted from the user query in combination with the additional information associated with the user to generate the augmented user query.

13. The system of claim 10, the one or more processors configured to:
    perform one or more tool identification operations to determine a recommended tool for a given task;

provide a solution to a user associated with the user query via a user interface, wherein the solution includes information associated with the recommended tool;

measure a quality of the solution subsequent to usage of the solution by the user; and calculate the quality of the solution, as a tool effectiveness score, as a function of one or more of: a total time taken by the user to embed the recommended tool's outputs into an overall solution; a total time taken by the user to solve intermediate steps and the one or more tasks; and an assigned numerical value for a quality of expertise of the user in building a remainder of the solution as well as in consuming the tool output.

14. The system of claim 10, the one or more processors configured to:

perform one or more tool identification operations to determine a recommended tool for a given task;

provide a solution to a user associated with the user query via a user interface, wherein the solution includes information associated with the recommended tool;

receive feedback from the user related to the solution, wherein the feedback includes at least an ease of use score; and store the feedback as additional organizational knowledge.

15. A non-transitory computer-readable storage medium storing instructions that, when executed by one or more processors, cause the one or more processors to perform operations for intelligent re-use of knowledge across an organization using a natural text-based querying framework, the operations comprising:

obtaining organizational knowledge from one or more data sources, wherein the organizational knowledge includes at least historical work record data that identifies a plurality of work items across an organization;

generating a knowledge representation of prior work performed for the organization based at least in part on the organizational knowledge, wherein generating the knowledge representation comprises performing one or more extraction operations to create individual work-record entities for each respective work item of the identified work items and performing one or more knowledge graph creation operations to create individual knowledge graphs corresponding to the individual work-record entities;

storing the knowledge representation at a graph database;

performing, for each individual knowledge graph, a plurality of operations, the plurality of operations comprising project name operations to identify and store project name information, subgraph operations to identify and store subgraph information, sentence embedding operations to identify and store sentence embedding information, and word embedding operations to identify and store word embedding information;

performing a query augmentation process to generate an augmented user query, wherein the query augmentation process corresponds to an implicit augmentation process and an explicit augmentation process; and responsive to receiving the augmented user query that is generated based at least in part on query data associated with a user query, performing one or more query-record mapping operations based at least in part on a comparison of information associated with the augmented user query to the project name information, the sentence embedding information, the word embedding information, the subgraph information, or a combination thereof.

16. The non-transitory computer-readable storage medium of claim 15, the operations further comprising:

receiving a multi-modal user query from a user, wherein the multi-modal user query includes project requirements, features, objectives, constraints, or any combination thereof; and performing the implicit augmentation process by augmenting the multi-modal user query with a known project context for the user to generate the augmented user query.

17. The non-transitory computer-readable storage medium of claim 15, the operations further comprising:

computing a function using: user experience scores for each of a plurality of tools for a given task; a match score of individual work records; and a tool effectiveness score; and providing, via a user interface, a solution comprising a set of tools having the highest computed scores to a user associated with the user query.

18. The non-transitory computer-readable storage medium of claim 17, the operations further comprising:

receiving a user experience score from the user associated with usage of the solution for a particular work-instance;

based on the received user experience score, re-computing the tool effectiveness score for the particular work-instance; and storing the re-computed tool effectiveness score as additional organizational knowledge.

* * * * *